United States Patent
Pich et al.

(10) Patent No.: US 10,253,596 B2
(45) Date of Patent: Apr. 9, 2019

(54) EQUIPMENT AND METHOD ENABLING TO DIRECTLY USE POWDER POLYMER IN HYDRAULIC FRACTURING

(71) Applicant: S.P.C.M. SA, Andrezieux Boutheon (FR)

(72) Inventors: Emmanuel Pich, Saint Priest en Jarez (FR); Marshall Bond, Richmond Hill, GA (US)

(73) Assignee: S.P.C.M. SA (FR)

( * ) Notice: Subject to any disclaimer, the term of this patent is extended or adjusted under 35 U.S.C. 154(b) by 6 days.

(21) Appl. No.: 15/049,889

(22) Filed: Feb. 22, 2016

(65) Prior Publication Data
US 2016/0168955 A1 Jun. 16, 2016

(30) Foreign Application Priority Data
Sep. 11, 2015 (FR) ..................... 15 58504

(51) Int. Cl.
| | |
|---|---|
| E21B 41/00 | (2006.01) |
| E21B 21/06 | (2006.01) |
| C09K 8/80 | (2006.01) |
| E21B 43/26 | (2006.01) |

(52) U.S. Cl.
CPC .............. *E21B 41/00* (2013.01); *C09K 8/80* (2013.01); *E21B 21/062* (2013.01); *E21B 43/26* (2013.01)

(58) Field of Classification Search
None
See application file for complete search history.

(56) References Cited

U.S. PATENT DOCUMENTS

| | | | | |
|---|---|---|---|---|
| 3,730,275 A | * | 5/1973 | McClaflin | C09K 8/68 137/13 |
| 3,884,252 A | * | 5/1975 | Kruka | C08J 3/203 137/13 |
| 4,086,663 A | | 4/1978 | Croft | |
| 4,434,861 A | * | 3/1984 | Howeth | B01D 45/04 175/206 |
| 5,899,641 A | | 5/1999 | Pfeiffer | |

(Continued)

FOREIGN PATENT DOCUMENTS

| | | |
|---|---|---|
| CA | 2839611 A1 | 7/2015 |
| FR | 2315982 A1 | 1/1977 |
| WO | 2010020698 A2 | 2/2010 |

*Primary Examiner* — Andrew Sue-Ako
(74) *Attorney, Agent, or Firm* — Forge IP, PLLC

(57) ABSTRACT

An installation for the dosing of a powder polymer having a particle size in the range from 100 to 500 micrometers intended to feed a blender in hydraulic fracturing operations, successively including: a powder polymer supply, from a pressurized tilting truck or from big bags emptied by pneumatic conveying, a mechanism for transporting the powder polymer fed by a compressor, and provided with a polymer transportation check valve, a hopper for receiving the powder polymer having a high level and a low level, the hopper being equipped with a pulse jet cleaning dust filter, as well as with a mechanism for controlling the check valve and the compressor according to the high and low levels, a screw feeder for dosing the powder polymer, positioned at the lower end of the hopper, the screw being equipped with a variable-speed motor capable of being remotely controlled.

10 Claims, 1 Drawing Sheet

(56) References Cited

U.S. PATENT DOCUMENTS

| | | | |
|---|---|---|---|
| 2006/0293196 A1* | 12/2006 | Harris | C09K 8/035 |
| | | | 508/591 |
| 2010/0329072 A1 | 12/2010 | Hagan et al. | |
| 2012/0273206 A1* | 11/2012 | Zamora | C09K 8/68 |
| | | | 166/308.1 |
| 2013/0292122 A1 | 11/2013 | Nichols et al. | |
| 2014/0054042 A1 | 2/2014 | Pich et al. | |
| 2014/0328137 A1* | 11/2014 | Lauder | B01F 5/061 |
| | | | 366/152.2 |
| 2015/0240148 A1 | 8/2015 | Luharuka et al. | |

* cited by examiner

EQUIPMENT AND METHOD ENABLING TO DIRECTLY USE POWDER POLYMER IN HYDRAULIC FRACTURING

FIELD OF THE INVENTION

The present invention relates to the dosing and the addition of polymers in hydraulic fracturing. More specifically, the present invention aims at equipment for dosing and adding polymers used in hydraulic fracturing as a drag reducer.

BACKGROUND OF THE INVENTION

Hydraulic fracturing aims at creating an additional level or permeability and to increase downhole gas or oil production surface areas. Indeed, low permeability, natural barriers of compact layers, impermeability due to drilling operations greatly limit hydrocarbon production. The gas or the oil contained in the unconventional reservoir cannot easily migrate from the rock to the production well without any stimulation.

The development of hydraulic fracturing has been dependent on the use of polymers to decrease surface pumping pressures, while maintaining the downhole fracturing pressure. This is called the drag reduction phenomenon.

Downhole fracturing requires pressures from 70 to 200 bars with very large volumes of water. Surface pumps work at 300-600 bars in average.

The addition of small doses of polymers, particularly of polyacrylamide type, enables to crack by strongly increasing the injected flow rate.

This currently requires injecting strong quantities of polymers in 10 or 15 sequences over 2 or 3 days. Such quantities may reach 10 tons for a fracturing operation.

For their ease of handling, polyacrylamides in the form of an emulsion have been used for years, with the following disadvantages:
 Transport of emulsion quantities which are three times larger than the quantities of active materials;
 Cost practically doubled with respect to powder polymers;
 Injection of hydrocarbons and of surface-active agents, more and more questioned by environmental groups;
 Tendency to thicken, despite the addition of antifreeze agents, in regions with very cold winters.

Recently, for reasons of cost and efficiency, equipment has been developed to dissolve powder polymers on dedicated trucks (WO2010/020698). This applies, in particular, to PowderFrac™ trucks using a dispersion/grinding material, improving the suspending of such powders, the dissolution thereof, and the pumping towards the blender used to supply the piston pump for the fracturing. However, the equipment is expensive and requires a relatively specialized staff.

There thus currently is a need for polymer dosing and addition equipment having a lower cost and a simplified use.

SUMMARY OF THE INVENTION

The present invention relates to equipment enabling to dose a powder polymer, used as a drag reducer, in a blender feeding an injection pump intended for hydraulic fracturing operations.

Generally, as known in hydraulic fracturing, the blender is a tank enabling to blend, in water or in saline water, the polymer as well as all the other ingredients of an injection composition, such as for example dispersing agents, anti-corrosion agents, bactericides, oxidizers, sand.

The polymer generally is present for in the order of one minute in the blender.

Generally, standard polymer powders used in hydraulic fracturing, for example, polyacrylamides, of particle size 0-1 mm, of very high molecular weights, have a dissolution time from 1 to 1.5 hours.

Actually, very often, the polyacrylamides are copolymers having a dissolution rate which is a function of their composition, of their molecular weight, and of the production method.

In the present invention, the particle size of the polymer is in the range from 100 to 500 micrometers, preferably from 150 to 300 micrometers.

A selection criterion is that the dissolution time of the powder polymer is shorter than the time spent in the blender, or is at most longer by 30% than said time.

According to an aspect of invention, from 80 to 90% by weight of the polymer are dissolved in less than one minute.

The remaining 10 to 20% are generally dissolved by mechanical effect of the piston pump in the transport, injection, or fracturing pipes which are generally located from 2,000 to 5,000 meters away from the dosage equipment according to the invention.

The second important parameter thus comprises dosing this powder directly in the blender. The adopted solution advantageously is a pneumatic conveying, which avoids any problem of freezing, on dissolving in water.

The polymer normally arrives on field in 16- to 20-ton bulk trucks, unloaded by tilting of the vessel and air pressure draining. The polymer may arrive in another packaging, such as for example in big bags, and an adaptation will be performed according to the logistical conditions.

In other words, the invention aims at an installation for the dosage of a powder polymer having a particle size in the range from 100 to 500 micrometers intended to feed a blender in hydraulic fracturing operations, successively comprising:
 a powder polymer supply, from a pressurized tilting truck or from big bags emptied by pneumatic conveying,
 means for transporting the powder polymer fed by a compressor, and provided with a polymer transportation check valve,
 a hopper for receiving the powder polymer having a higher level and a lower level, the hopper being equipped with a pulse jet cleaning dust filter, as well as with means for controlling the check valve and the compressor according to the higher and lower levels,
 a screw feeder for dosing the powder polymer, positioned at the lower end of the hopper, the screw being equipped with a variable-speed motor capable of being remotely controlled.

In a first embodiment, the hopper is arranged laterally with respect to the blender. In practice, it is located close to the truck or to the big-bags. In this case, the installation further comprises means for transporting the powder polymer from the dosing screw to the blender. The transport means preferably comprises an ejector nozzle, a compressor which feeds it, and a transport hose. Thus, the powder polymer is sent via the transport hose into the blender over a distance from 20 to 50 meters.

According to this first embodiment, there is a risk of dust, particularly in case of wind. To avoid this, the installation may further comprise:

either a system for wetting the powder polymer, comprising a tube and spray nozzles arranged at the free end of the transport hose;

or a reception hopper with a powder outlet feeder to avoid the dispersion of fines due to the conveying air, or a cyclofilter.

Thus, on arrival above the blender, the powder may be:

either ejected as such into the blender, or wetted by the spray nozzles, or treated to avoid the dispersion of fines due to the conveying air as it passes through the reception hopper equipped with a feeder or with a cyclofilter.

In a second embodiment, the hopper is positioned above the blender. In this case, the transport means between the screw and the blender is not necessary. In practice, the hopper is sequentially fed from the truck by pneumatic conveying and the powder is dosed from the hopper, for example, with a rotary feeder. Optionally, the hopper is equipped with a filter to avoid placing fine polymer particles in contact with the atmosphere.

According to this second embodiment, the installation may further comprise the same powder polymer wetting system as previously described.

Another aspect of the invention relates to a method of dosing a powder polymer having a particle size in the range from 100 to 500 micrometers intended to feed a blender in operations of hydraulic fracturing of an underground formation using the above-described installation.

The method of hydraulic fracturing of an underground formation according to the invention comprises the steps of:

feeding a powder polymer having a particle size in the range from 100 to 500 micrometers to the installation according to the invention, after the dosing, feeding the powder polymer to a blender, forming a mixture by dissolution of the powder polymer in the blender, so that at least 80% by weight of the powder polymer, preferably at least 90%, is dissolved in less than one minute, injecting the resulting mixture into an underground formation.

On arrival onto the blender, the powder polymer may be:

either ejected as such into the blender, or wetted by a system for wetting the powder polymer, comprising a tube and spray nozzles arranged at the free end of the transport hose, or processed to avoid the dispersion of fines due to the conveying air as it passes through the reception hopper equipped with a feeder or with a cyclofilter.

As already discussed, a selection criterion is for the dissolution time of the powder polymer to be shorter than the time spent in the blender, or is at most greater by 30% than said time.

The method according to the invention may further comprise a step of adding into the blender other ingredients of a hydraulic fracturing injection composition, such as for example dispersing agents, anti-corrosion agents, bactericides, oxidizers, sand. The addition is generally performed continuously to obtain a homogeneous mixture.

Advantageously, the powder polymer used according to the invention comprises at least one non-ionic monomer which is selected from the group comprising acrylamide, methacrylamide, acrylic acid hydroxyl alkyl esters, methacrylic acid hydroxyl alkyl esters, N-vinyl pyrrolidone, N-vinyl formamide, and polyethylene glycol methacrylate. Preferably, the non-ionic monomer is acrylamide.

Optionally, the powder polymer used according to the invention may comprise an anionic monomer which is selected from the group comprising acrylic acid, methacrylic acid, allyl sulfonic acid, 2-acrylamido-2-methyl propane sulfonic acid as free acids, or salts thereof.

Optionally, the powder polymer used according to the invention may comprise at least one cationic monomer which is selected from the group comprising quaternized or salified ADAME, quaternized or salified MADAME, DADMAC, APTAC, and MAPTAC.

The molecular weight of the polymer used according to the invention is in the range from 1 to 30 million daltons, preferably from 5 to 25 million daltons, more preferably from 15 to 25 million daltons.

Preferably, the polymer used is an acrylamide (co)polymer.

The invention and the resulting advantages will better appear from the following non-limiting drawings and examples, provided as an illustration of the invention.

DETAILED DESCRIPTION OF THE INVENTION

Figure 1:
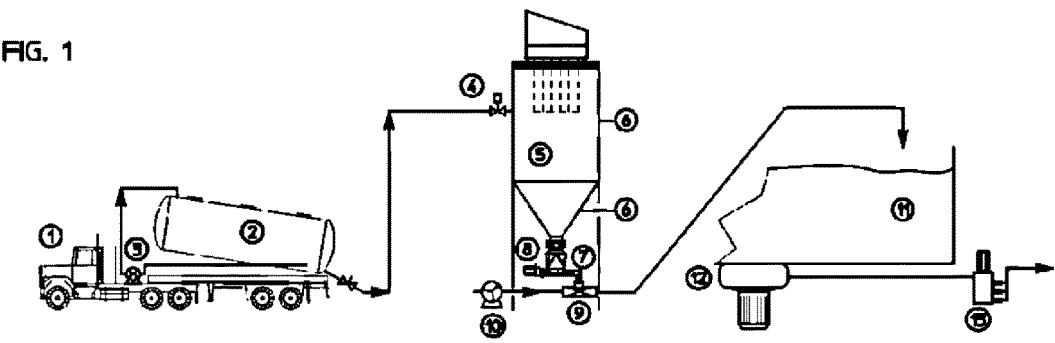
FIG. 1 illustrates the steps of delivery, dosing, dissolution, and injection of a powder polymer in a hydraulic fracturing method according to a specific embodiment of the invention.

The equipment according to the invention can be described as follows:

FIG. 1 corresponds to the first embodiment.

A bulk transport truck (1) with a tilting pressure vessel (2) is emptied by the pressure provided by a compressor (3) into a hopper (5) via an on-off valve (4) controlled by the higher and lower levels (6) of the hopper (5). The dosing is performed by a dosing screw (7) provided with a variable-speed motor (8) controlled by a central control room.

An ejector nozzle (9) fed by a compressor (10) sends the powder towards the blender (11) via a transport hose. The blender (11) is provided with a booster pump (12) for the injection pump (13).

In the blender (11), the powder polymer is advantageously dissolved in less than one minute. Other ingredients of the injection composition may be added.

Figure 2A:
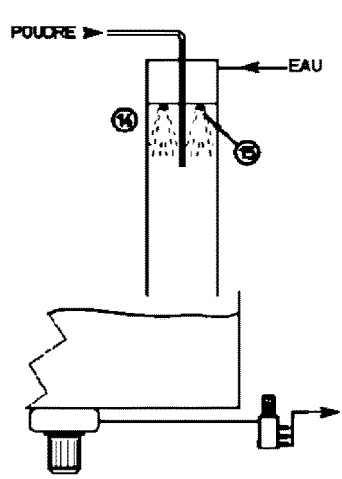
FIG. 2A illustrates the wetting of a powder polymer, added in a blender, in a hydraulic fracturing method according to a specific embodiment of the invention.
Figure 2B:
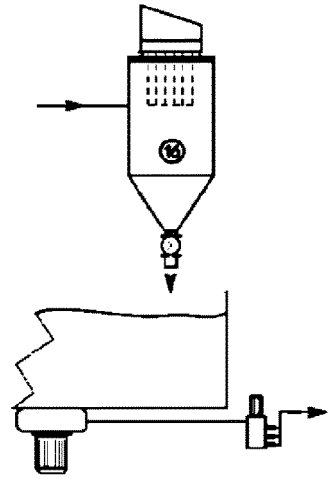
FIG. 2B illustrates the feeding of a polymer to a blender, in a hydraulic fracturing method according to a specific embodiment of the invention.

In this case, to avoid dust, the blender (11) may be fed:

either by a wetting system where the powder is fed in a tube (14), and wetted with water or saline water originating from the spray nozzles (15), (FIG. 2A);

or by a cyclofilter (16) enabling to separate air from the powder ejected by a calibrated pipe into the blender. (FIG. 2B).

Figure 3:
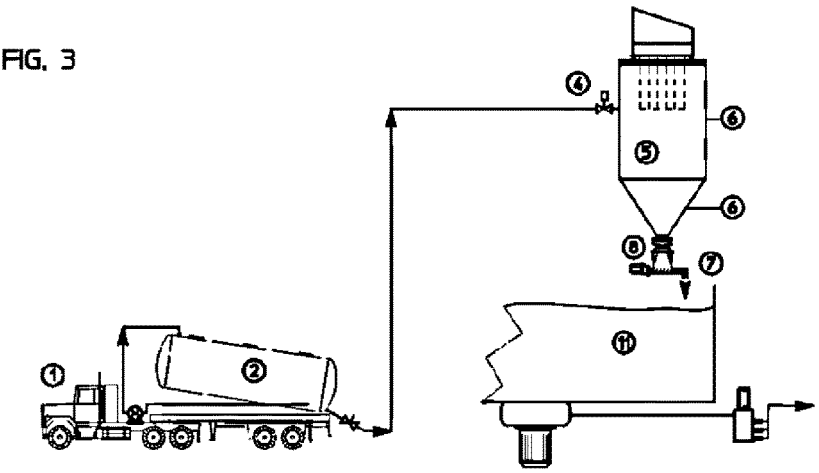
FIG. 3 illustrates the steps of delivery, dosing, dissolution, and injection of a powder polymer in a hydraulic fracturing method according to a specific embodiment of the invention.

FIG. 3 corresponds to the second embodiment.

The truck (1) unloads the vessel (2) with the compressor (3) into a hopper (5) located above the blender via a valve (4) controlled by the higher and lower levels (6). The dosing screw (7) with a variable-speed motor (8) is controlled by the main control room.

The dosing equipment according to the invention has the following advantages. It may both replace:

emulsions, with a lower cost and a higher quality;

powder polymers placed in solution before the injection into the blender with much heavier and more expensive equipment.

It will be within the abilities of those skilled in the art to find similar means for applying the method.

What is claimed is:

1. An installation for the dosing of a powder polymer having a particle size in the range from 100 to 500 micrometers, directly in a blender being a tank enabling to blend, in hydraulic fracturing operations, successively comprising:
    a powder polymer supply, from a pressurized tilting truck or from bags emptied by pneumatic conveying,
    a transporter that transports the powder polymer fed by a compressor, and provided with a polymer transportation check valve,
    a hopper for receiving the powder polymer having a higher level and a lower level, the hopper being equipped with a pulse jet cleaning dust filter, and the check valve and the compressor being controlled according to the higher and lower levels,
    a screw feeder for dosing the powder polymer, positioned at the lower end of the hopper, the screw being equipped with a variable-speed motor capable of being remotely controlled; and
    wherein from 80% to 90% by weight of the powder polymer is dissolved in the blender in less than one minute, the polymer being present for on the order of one minute in the blender, and wherein a remaining 10% to 20% by weight of the powder polymer is dissolved after having left the blender, by mechanical effect of a piston pump in transport, injection or fracturing pipes.

2. The installation of claim 1, characterized in that when the hopper is arranged laterally with respect to the blender, said installation further comprises a second transporter that transports the powder polymer from the dosing screw to the blender.

3. The installation of claim 2, characterized in that the second transporter comprises an ejector nozzle, a compressor which feeds it, and a transport hose.

4. The installation of claim 2, characterized in that the installation further comprises:
    either a system for wetting the powder polymer, comprising a tube and spray nozzles arranged at the free end of the transport hose;
    or a reception hopper with a powder outlet feeder or a cyclofilter to avoid the dispersion of fines due to the conveying air.

5. The installation of claim 1, characterized in that the hopper is positioned above the blender.

6. The installation of claim 5, characterized in that the installation further comprises a system for wetting the powder polymer, comprising a tube and spray nozzles.

7. A method of dosing a powder polymer having a particle size in the range from 100 to 500 micrometers adapted to feed a blender in operations of hydraulic fracturing of an underground formation using the installation of claim 1.

8. The method of claim 7, characterized in that the method comprises the steps of:
    feeding a powder polymer having a particle size in the range from 100 to 500 micrometers,
    after the dosing, feeding the powder polymer to a blender,
    forming a mixture by dissolution of the powder polymer in the blender, so that from 80% to 90% by weight of the powder polymer is dissolved in less than one minute,
    injecting the resulting mixture into an underground formation.

9. The method of claim 8, characterized in that on arrival on the blender, the powder polymer is ejected into the blender.

10. The method of claim 8, characterized in that the polymer has a particle size in the range from 150 to 300 micrometers.

* * * * *